United States Patent

Jang

Patent Number: 5,916,060
Date of Patent: Jun. 29, 1999

[54] HYDRAULIC CONTROL SYSTEM OF AN AUTOMATIC TRANSMISSION FOR A VEHICLE AND A SHIFTING CONTROL METHOD THEREOF

[75] Inventor: Jaeduk Jang, Kyung-do, Rep. of Korea

[73] Assignee: Hyundai Motor Company, Seoul, Rep. of Korea

[21] Appl. No.: 08/912,675

[22] Filed: Aug. 18, 1997

[30] Foreign Application Priority Data

| Aug. 30, 1996 | [KR] | Rep. of Korea | 96-36768 |
| Aug. 30, 1996 | [KR] | Rep. of Korea | 96-36771 |
| Aug. 30, 1996 | [KR] | Rep. of Korea | 96-36772 |
| Aug. 30, 1996 | [KR] | Rep. of Korea | 96-36773 |

[51] Int. Cl.$^6$ ................................. F16H 59/18
[52] U.S. Cl. .......................................... 477/155
[58] Field of Search ............................ 477/154, 155

[56] References Cited

U.S. PATENT DOCUMENTS

| 4,763,545 | 8/1988 | Shibayama et al. | 477/155 |
| 4,949,595 | 8/1990 | Shimanaka | 477/154 |
| 4,970,916 | 11/1990 | Narita | 477/154 |
| 5,168,777 | 12/1992 | Isono et al. | 477/155 |
| 5,540,634 | 7/1996 | Jang et al. | |

FOREIGN PATENT DOCUMENTS

| 0317936 | 5/1989 | European Pat. Off. . |
| 0337495 | 10/1989 | European Pat. Off. . |
| 0704641 | 4/1996 | European Pat. Off. . |

Primary Examiner—Dirk Wright

[57] ABSTRACT

A hydraulic control system of an automatic transmission for a vehicle which includes a pressure regulator for regulating hydraulic pressure created by an oil pump, manual and automatic shift controllers for forming a shift mode according to a position of a shift selection lever, a hydraulic controller for controlling shift quality and shift response to smoothly change transmission speeds when shifting, and a hydraulic pressure distributor and release mechanism which distributes an appropriate amount of hydraulic pressure to and releases pressure from each of the friction elements in the automatic transmission, A hydraulic distribution and release device has a 2-4/3-4 shift valve, a 2-3/4-3 shift valve, and an end-clutch valve for supplying to or releasing from friction elements hydraulic pressure. The preasure is controlled by first and second pressure control valves of the hydraulic pressure controller, through port conversion realized by control pressure, and supplied to lines for each speed through a shift control valve operated according to ON/OFF states of solenoid valves by a transmission control unit. The 2-3/4-3 shift valve is connected to a line to which an exhaust port provided with an orifice is installed.

37 Claims, 17 Drawing Sheets

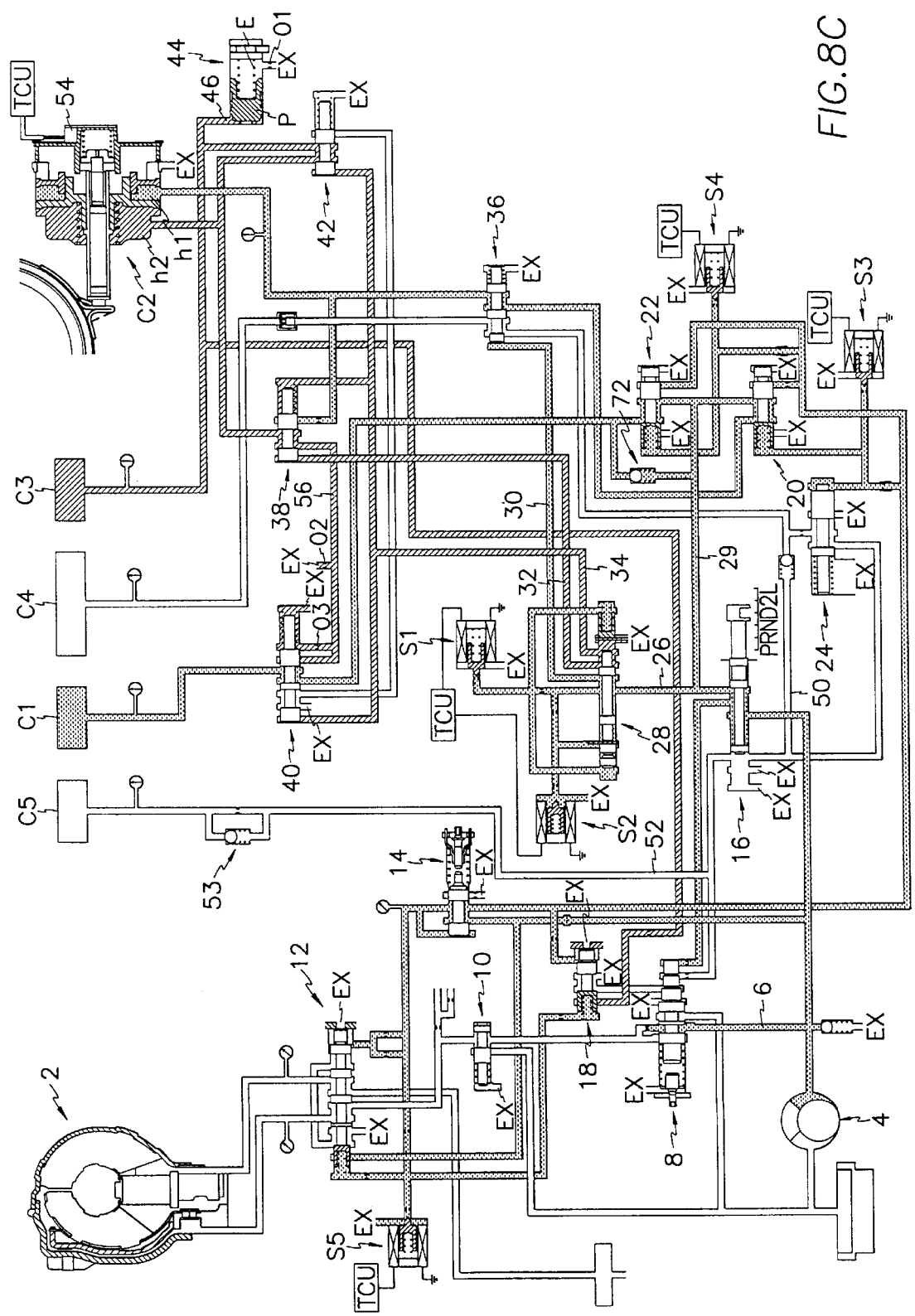

HYDRAULIC CONTROL SYSTEM OF AN AUTOMATIC TRANSMISSION FOR A VEHICLE AND A SHIFTING CONTROL METHOD THEREOF

BACKGROUND OF THE INVENTION

The present invention relates to a hydraulic control system of an automatic transmission for a vehicle and a shifting control method thereof. More particularly, the present invention relates to a hydraulic control system and a shifting control method which improves shift response, controls shift modes according to engine power ON/OFF states, and controls at least one input element independently, and to a shifting control method using such a hydraulic control system.

Generally, a conventional automatic transmission includes a torque convertor, a multi-stage gear shift mechanism connected to the torque convertor, and a hydraulic control system which selects a gear stage of the gear shift mechanism according to a driving state of the vehicle.

The above hydraulic control system includes a pressure regulator, which regulates hydraulic pressure created in a oil pump; manual and automatic shift controllers, which select a shift mode; a hydraulic pressure controller, which controls shift quality and shift response for smoothly selecting a shift mode during shifting; a damper clutch controller, for operating a torque convertor damper clutch; and a hydraulic pressure distributor, which supplies an appropriate amount of hydraulic pressure to each of the friction elements.

The amount of hydraulic pressure supplied by the hydraulic pressure controller, and the hydraulic pressure control method greatly affects shift quality and shift response. Accordingly, when down shifting from fourth speed to third speed, the hydraulic pressure, which is supplied to an input element of the fourth speed, is reduced temporarily, resulting in engine speed run-up and shift shock.

As shift control is performed, whether the engine is in a power ON or OFF state, the amount that the driving force can be increased in the power OFF state is limited. As the length of time that the transmission stays in fourth speed is reduced, a transmission tie-up phenomenon occurs. In addition, when skip down shifting from fourth speed to second speed, shift response is slow because the transmission passes through third gear. Also, when driver-induced skip shifting (e.g., by suddenly and briefly releasing the accelerator pedal) from second speed to fourth speed is performed, shift response is again slow because the transmission passes through third speed. This is because the conventional hydraulic control system uses the same hydraulic pressure as both a release pressure for friction elements in fourth speed and operating pressure for friction elements in third speed, whereby the problem of passing through third speed results. Because of this problem, especially when shifting from third speed to fourth speed, because hydraulic pressure lines to the friction elements of the third speed and fourth speed are interconnected, independent control of the friction elements is needed.

SUMMARY OF THE PRESENT INVENTION

The present invention has been made in an effort to solve the above problems. The present invention discloses a hydraulic control system of an automatic transmission for a vehicle and a shifting control method thereof, which improves shift response, performs shifting control in power ON/OFF states, and controls each friction element independently.

The hydraulic control system is realized through a hydraulic pressure regulator, which regulates hydraulic pressure created in, for example, an oil pump; manual and automatic shift controllers, which are able to select a shift mode according to a position of a selection lever, such as a gearshift lever; a hydraulic pressure controller, which controls shift quality and shift response for smoothly changing speeds when shifting; and a hydraulic pressure distributor and release, which distributes an appropriate amount of hydraulic pressure to, and releases the pressure from, each of the friction elements.

The hydraulic pressure distributor and release includes a 2-4/3-4 shift valve, a 2-3/4-3 shift valve, and an end-clutch valve. Hydraulic pressure is supplied to lines for each speed by port conversion of a shift control valve, operated according to an ON/OFF state of solenoid valves set by a transmission control unit, thereby controlling port conversion of the 2-4/3-4 shift valve, 2-3/4-3 shift valve, and end-clutch valve. Hydraulic pressure, controlled by the first and second pressure control valves of the hydraulic pressure control means, makes each friction element engage or release through port conversion of the 2-4/3-4 shift valve, 2-3/4-3 shift valve, and end-clutch valve. The 2-3/4-3 shift valve is connected to a line to which an exhaust port provided with an orifice is installed.

BRIEF DESCRIPTION OF THE DRAWINGS

The accompanying drawings, which are incorporated in and constitute a part of the specification, illustrate ambodiment of the invention, and, together with the description, serve to explain the principles of the invention:

FIGS. 6A and 6B are hydraulic circuit diagrams which show a shifting procedure according to the which show a shifting control of FIGS. 2A and 2B, wherein FIG. 6A is a hydraulic circuit diagram in a power ON state, and FIG. 6B is hydraulic circuit diagram in a power OFF state;

FIGS. 8A, 8B, and 8C are hydraulic circuit diagrams which show a shifting procedure according to the shifting control of FIGS. 4A and 4B, wherein FIG. 8A is a hydraulic circuit diagram in a power ON state, FIG. 8B is an initial hydraulic circuit diagram in a power OFF state, and FIG. 8C is a final hydraulic circuit diagram in a power OFF state; and FIGS. 9A and 9B are hydraulic circuit diagrams which show a shifting procedure according to the shifting control of FIGS. 5A and 5B, wherein, FIG. 9A is an initial hydraulic circuit diagram in a power OFF state, and FIG. 9B is a final hydraulic circuit diagram in a power OFF state.

DESCRIPTION OF THE PREFERRED EMBODIMENT

Preferred embodiments of the present invention will now be described in detail with reference to the accompanying drawings.

Figure 1:
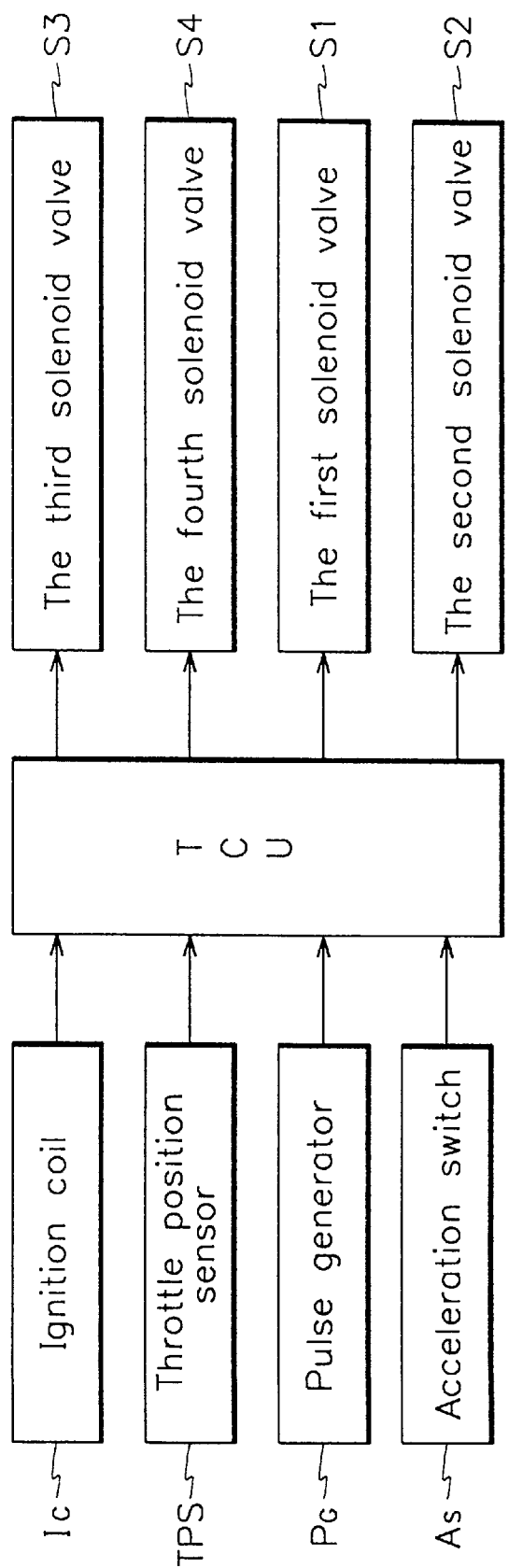
FIG. 1 is a block diagram of a shifting control unit according to the present invention.

FIG. 1 is a block diagram illustrating the hardware configuration of a shift control unit in which an ignition coil (Ic) for detecting the engine RPM is connected to the first input terminal of a transmission control unit (TCU). The TCU receives two pulse signals transferred from the ignition coil (Ic) per one revolution of the engine. The second input terminal of the TCU is connected to a throttle position sensor (TPS) for detecting an opening degree of a throttle valve. The third input terminal of the TCU is connected to a pulse generator (Pg) for detecting the RPM of an output shaft of a transmission. The fourth input terminal of the TCU is connected to an accelerator switch (As) for detecting whether the driver is depressing an accelerator pedal or not.

Some output terminals of the TCU are connected to two shift control solenoid valves S1 and S2 as a means for realizing different shift modes, and the TCU controls each of the valves S1 and S2 to be in ON/OFF states. The remaining output terminals of the TCU are connected to two solenoid valves S3 and S4 as a means for controlling the hydraulic pressure, and the TCU duty controls each valve S3 and S4. The above shift control unit controls shifting in the hydraulic control system (as shown in FIGS. 6A and 6B, FIG. 7, FIGS. 8A, 8B, and 8C, and FIGS.9A, and 9B) according to the present invention.

The above hydraulic control system comprises a torque converter 2 which converts the torque of the power delivered from the vehicle engine (not shown) and transmits the converted torque to the transmission (not shown), and an oil pump 4 which generates and conveys hydraulic pressure required for torque conversion and shift mode control.

The above hydraulic control system includes a pressure regulation valve 8 for maintaining the hydraulic pressure which is produced in the oil pump 4 and delivered through a line 6, at a fixed level; a hydraulic pressure regulator including a torque converter control valve 10 which regulates hydraulic pressure for the torque converter 2 and for lubrication; a damper clutch controller including a damper clutch control valve 12 for increasing the power transmission efficiency of the torque converter 2. Also, the hydraulic control system includes a reducing valve 14 which generates pressure at a lower level than line pressure, and a manual valve 16 which operates according to a position of a selection lever (not shown), and changes pressure lines. Hydraulic pressure, reduced by the reducing valve 14, is used as control pressure for high-low pressure valve 18, which minimizes operation loss of the oil pump 4 by lowering line pressure in high-velocity modes. Also, the reduced pressure is supplied to first and second pressure control valves 20 and 22 of the hydraulic pressure controller, thereby controlling the respective valves.

The hydraulic pressure delivered to the first and second pressure control valves 20 and 22 controls an N-R control valve 24, which alleviates shift shock when shifting from a neutral "N" range to a reverse "R" range. A pressure line 26, through which hydraulic pressure is conveyed when the manual valve 16 is in a drive "D" range, is connected to a shift control valve 28, which changes a pressure line according to the respective ON/OFF states of the first and second solenoid valves S1 and S2, as controlled by the TCU. At the same time, the pressure line 26 is connected to a first speed line 29, supplying the hydraulic pressure to the first and second pressure control valves 20 and 22.

The shift control valve 28 is connected to a second speed line 30, a third speed line 32, and a fourth speed line 34, and supplies control pressure to a plurality of shift valves to control shifting. Namely, the second speed line 30 supplies pressure to a left-end port of a 1-2 shift valve 36 of the hydraulic pressure distributor, thereby allowing control of the 1-2 shift valve 36; the third speed line 32 supplies pressure to a left-end port of a 2-3/4-3 shift valve 38, thereby allowing control of the 2-3/4-3 shift valve 38; and the fourth speed line 34 supplies pressure to a right-end port of the 2-3/4-3 shift valve 38, to a left-end port of a 2-4/3-4 shift valve 40 and to a left-end port of an end-clutch valve 42, thereby allowing control of each of these valves.

The first hydraulic pressure control valve 20 changes a path through which hydraulic pressure flows, according to the third solenoid valve S3, while the second hydraulic pressure control valve 22 does the same according to the fourth solenoid valve S4. The hydraulic pressure passing through the second pressure control valve 22 is supplied to a first friction element C1, which is an input element of the first speed, through the 2-4/3-4 shift valve 40. A line is connected to the first pressure control valve 20 through which the hydraulic pressure, after passing through the 1-2 shift valve 36, is supplied to an operation chamber h1 of a second friction element C2, which is a reaction force element of the second speed. Also, the hydraulic pressure passing through the 1-2 shift valve 36 passes through the 2-3/4-3 shift valve 38 and is then supplied to a releasing chamber h2 of the second friction element C2. Simultaneously, the hydraulic pressure passes through an accumulator 44 and is supplied to the third friction element C3, operating as an input element of the third speed.

The accumulator 44 has a piston P, on one side of which an elastic member E is installed and on the other side of which hydraulic pressure is provided. As a result, when hydraulic pressure moves the piston P, the elastic member E is compressed, and the member E pushes the piston P when the hydraulic pressure is released. Accordingly, if the piston P is moved to the left, the release of hydraulic pressure, supplied to the third friction element C3 and the release chamber h2 of the second friction element C2, is temporarily delayed. This prevents shifting into the second speed when skip down shifting from a third speed to a first speed.

The accumulator 44 has an exhaust port EX equipped with an orifice O1 generating a damping force when exhausting the hydraulic pressure.

When the manual valve 16 is in the reverse "R" range, the hydraulic pressure supplied to a first reverse control line 50 flows to a fourth friction element C4, operating as a reaction force element in the reverse "R" range, through the 1-2 shift valve 36. Also, the second reverse control line 52 is connected to the manual valve 16 in order to operate the fifth friction element C5, operating as a input element in "R" range. A check valve 53 is fixed to the second reverse control line 52 to delay a release of the hydraulic pressure, thereby improving shift quality.

A kick-down switch 54, which is turned ON or OFF by the movement of the piston P and which transmits corresponding signals to the TCU, is fixed to the operation chamber h1 of the second friction element C2. A left-end port of the 2-3/4-3 shift valve 38 is connected to a right-end port of the 2-4/3-4 shift valve 40 through a line 56 in which orifices O2 and O3 are provided to delay the release of hydraulic pressure. Valve, discussed below, is a solenoid valve for controlling the damper clutch control valve 12.

This hydraulic control system is used to control shifting in the well-known ravigneaux-type gear train. The ravigneaux-type gear train has three clutches for transmitting rotating power, two brakes forming rotation elements, and a one-way clutch which can rotate in only one direction. Shifting of the above gear train is performed by changing friction elements operated according a particular shifting stage, described herein below.

Controlling the first speed in the drive "D" range is accomplished by engaging the first friction element C1 through hydraulic pressure and by restraining a planetary carrier of a compound planetary gear unit with the one-way clutch, synchronizing the same. In order to control the second speed in the drive "D" range, the one-way clutch is freed, while the first friction element engaged and the second friction element becomes engaged, constraining a reverse sun gear of a compound planet gear unit. This, in turn, results in synchronizing the same. Controlling the third speed in the drive "D" range is accomplished by engaging the first and third friction elements C1 and C3 and by releasing the second friction element engaged in the second speed. Controlling the fourth speed in the drive "D" range is accomplished by releasing the first friction element, and by engaging the second friction element again, while the third friction element remains engaged.

Figure 2A:
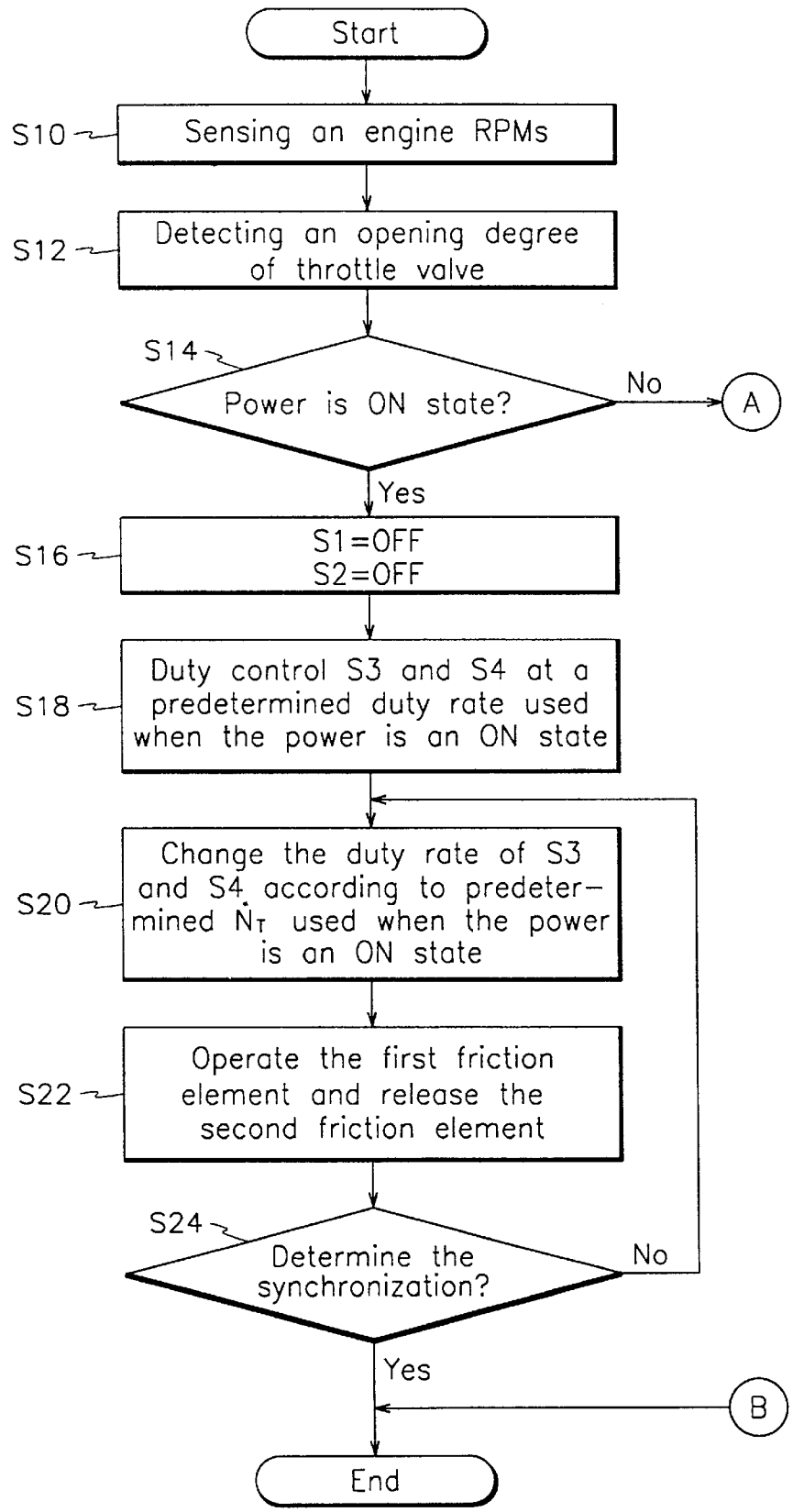
FIGS. 2A and 2B are flow charts which explain down shifting from fourth speed to third speed according to a power ON and power OFF state.
Figure 2B:
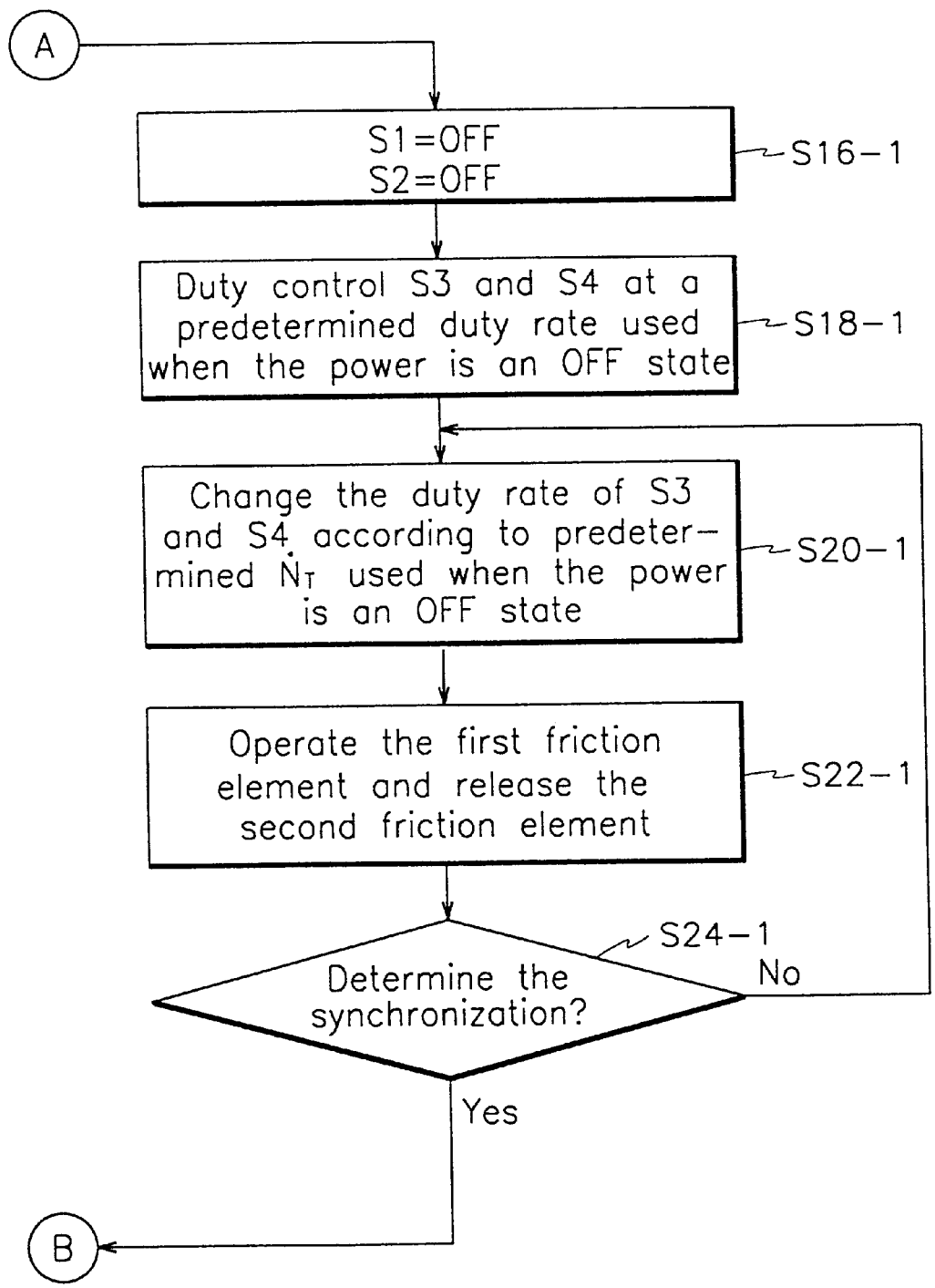
Figure 6A:
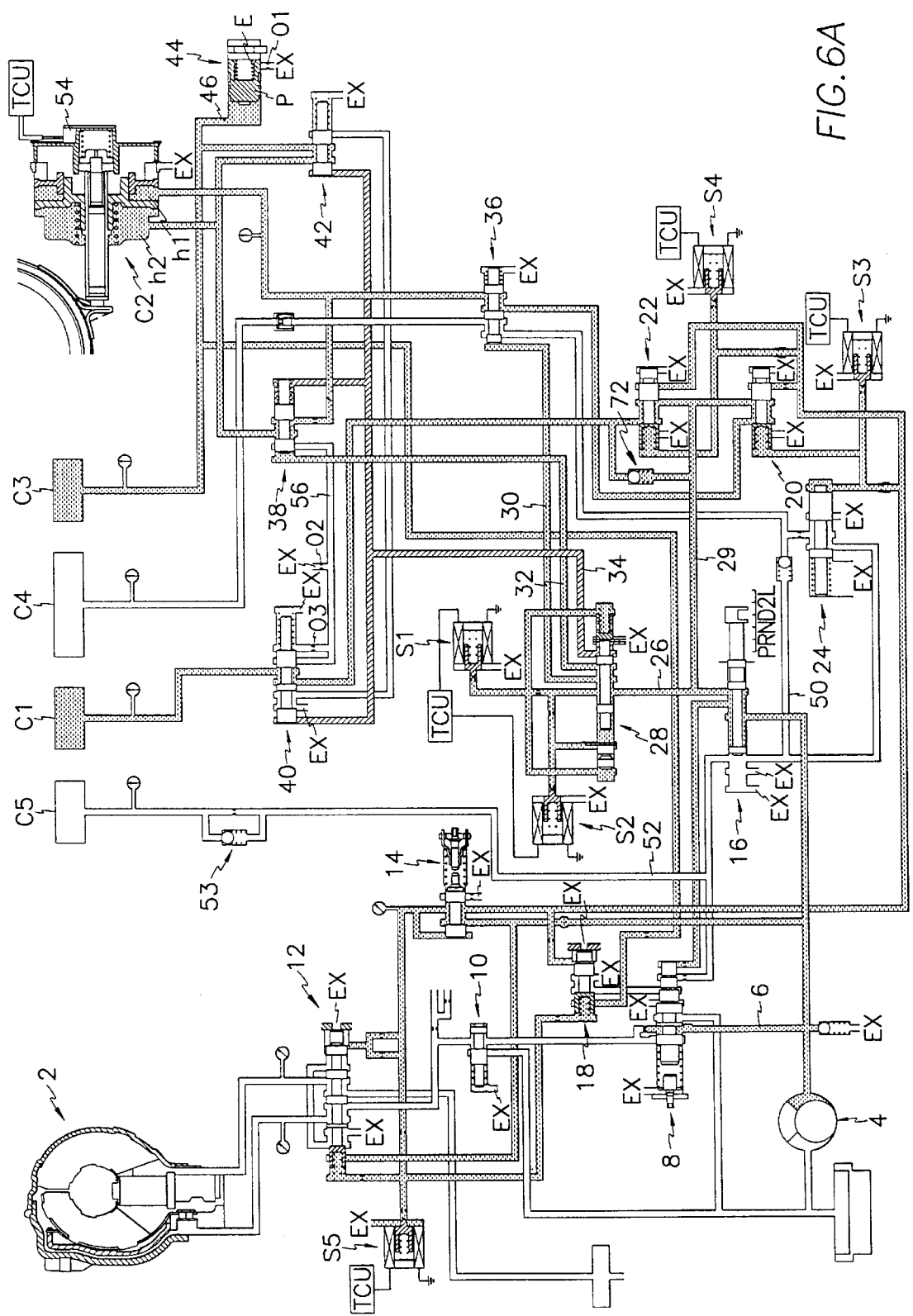
Figure 6B:
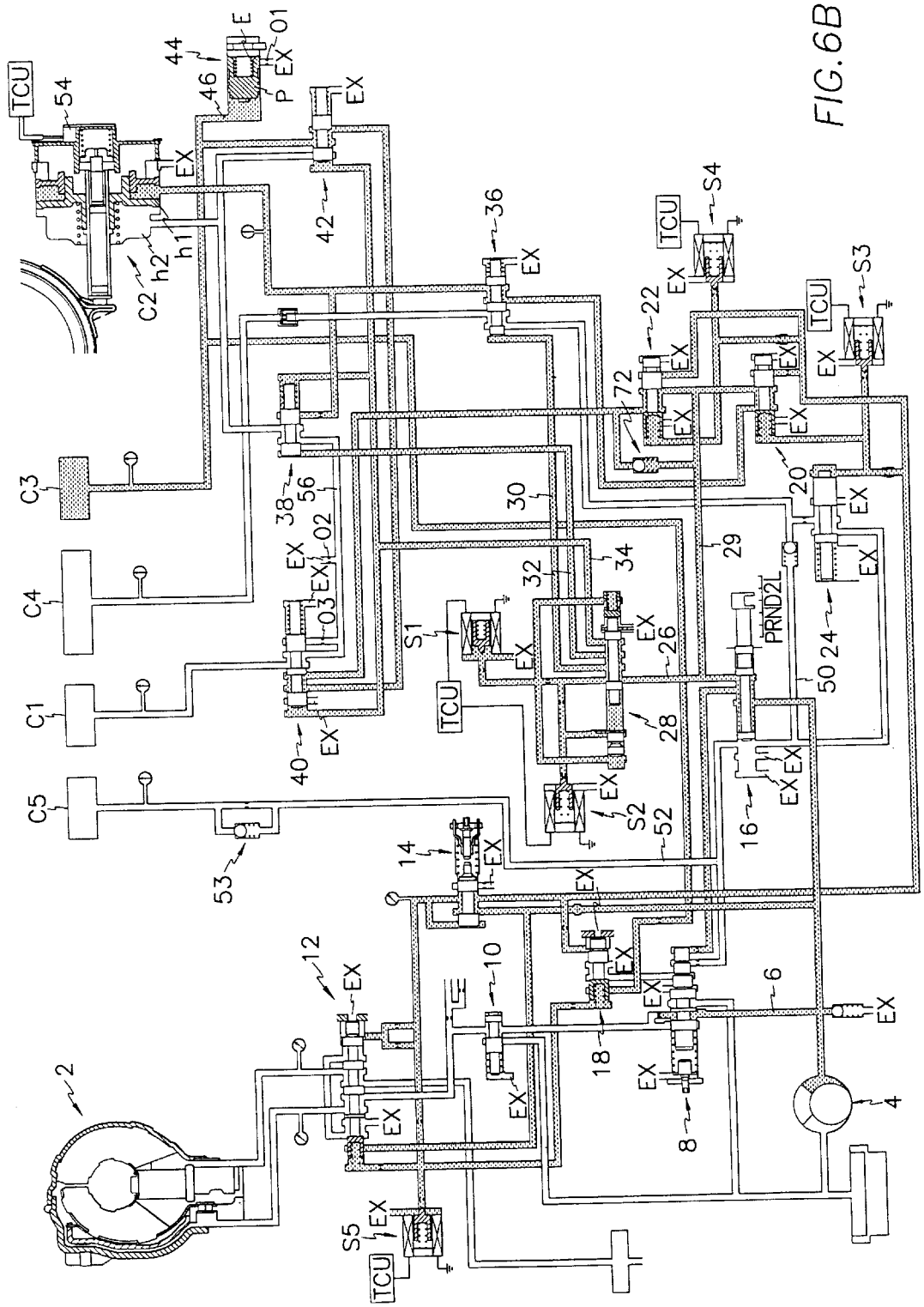

The hydraulic pressure control system for controlling permits such control using the following method, according to a control logic of the TCU. FIG. 6A illustrates shifting from fourth speed to third speed, when the TCU senses that the power state is ON. FIG. 6B illustrates shifting from fourth speed to third speed when the TCU senses that the power state is OFF. FIGS. 2A and 2B are flow charts for explaining the control method shifting as illustrated in FIGS. 6A and 6B, wherein, when hydraulic pressure is supplied to the third friction element C3 and the operational chamber h1 of the second friction element C2, (i.e., in a fourth speed state), shifting into third speed is realized by signals transmitted to the TCU.

First, the TCU senses engine RPM via the signal transmitted from the ignition coil Ic (S10), and also senses an opening degree of the throttle valve from the signal transferred from the TPS (S12). On the basis of this information, the TCU determines whether the power is in an ON or OFF state (S14).

If the power is in an ON state, the TCU switches the first and second solenoid valves S1 and S2 to OFF (S16). Through this control by the TCU, the hydraulic pressure flowing through the line 26 moves a spool S of the shift control valve 28, thereby blocking the hydraulic pressure flowing through the fourth speed line 34. Accordingly, hydraulic pressure is delivered only to the first speed line 29, the second speed line 30, and the third speed line 32. Meanwhile, the third and fourth solenoid valves S3 and S4 are duty controlled to a predetermined duty rate used when the power is in an ON state (S18). Accordingly, valve spools of the 2-4/3-4 shift valve 40, 2-3/4-3 shift valve 38, and end-clutch valve 42, respectively, move to positions as shown in FIGS. 6A. FIG. 6A shows the initial state of shifting from fourth to third while in a power ON state. Once duty control is performed in the above step S18, duty rates of the third and fourth solenoid valves S3 and S4 are changed according to a predetermined time rate of turbine revolutions used when the power is in an ON state.

By the way of the above control method, the hydraulic pressure flowing through the first speed line 29 is supplied to the first friction element C1 via the second pressure control valve 22 and 2-4/3-4 shift valve 40, thereby engaging element C1. Also, the hydraulic pressure, supplied to the release chamber h2 of the second friction element C2 through the 2-3/4-3 shift valve 38, is delivered to the third friction element C3 via the end-clutch 42. An impact load created thereby is absorbed by the accumulator 44. Therefore, in the fourth speed, the pressure line, which supplies the hydraulic pressure, passing through the second pressure control valve 22, the 2-4/3-4 shift valve 40 and the end-clutch valve 42 to the third friction element, is changed. Accordingly, the first friction element C1 is operated, the operation of the second friction element C2 is discontinued, and the third friction element C3 is left operating, causing down shifting to the third speed (S22). At this stage, it is determined whether the synchronization is accomplished (S24), and if not, a feedback is performed to step S20.

If the power is OFF at step S14, the TCU switches the first and second solenoid valves S1 and S2 to power OFF states (S16-1) (see FIG. 2B), and duty controls the third and fourth solenoid valves S3 and S4 to a predetermined duty rate used when the power state is OFF (S18-1). The duty rate is changed as a predetermined time rate of turbine revolutions used when the power is in an OFF state (S20-1). FIG. 6B shows the initial state when shifting from fourth to third while the power is in an OFF state, and the shifting procedure is as follows.

While hydraulic pressure, controlled by the second pressure control valve 22, is supplied to the third friction element C3, the hydraulic pressure routing is changed to be controlled by the first pressure control valve 20 by changing ports in the end-clutch valve 42. As in the power ON state, turbine RPM are increased in the power OFF state and both the first and second solenoid valves S1 and S2 are switched to OFF. However, in the power OFF state, turning the first solenoid valve S1 OFF is done only after a fixed amount of time $T_s$ has passed, and not immediately, as in the power ON state, thereby extending the time maintained in the fourth speed, which makes a tie-up control possible.

Also, when the fourth solenoid valve S4 is switched to its maximum duty rate, the third solenoid valve S3 starts to be duty controlled. Also, when the third solenoid valve S3 reaches its maximum duty rate, the duty rate of the fourth solenoid valve S4 is switched to its minimum level. Further, the duty rate of the third solenoid valve S3 is changed rapidly, while that of the fourth solenoid valve S4 is changed more slowly. As a result, disengagement of the second friction element C2 is delayed while the operational pressure applied to the third friction element C3 is reduced.

Through the above operation, the first friction element C1 is engaged independently, and the second friction element C2 is released the moment the third friction element C3 is engaged (S22-1), thereby completing the process (S24-1). If synchronization has not been completed, feedback is performed to step S20-1. This down shifting control is performed differently in the power ON state and power OFF state. When in the power OFF state, the down shifting control is able to perform tie-up control by increasing the amount of time that the transmission is in the fourth speed, and the first friction element C1 can be controlled independently.

Figure 3A:
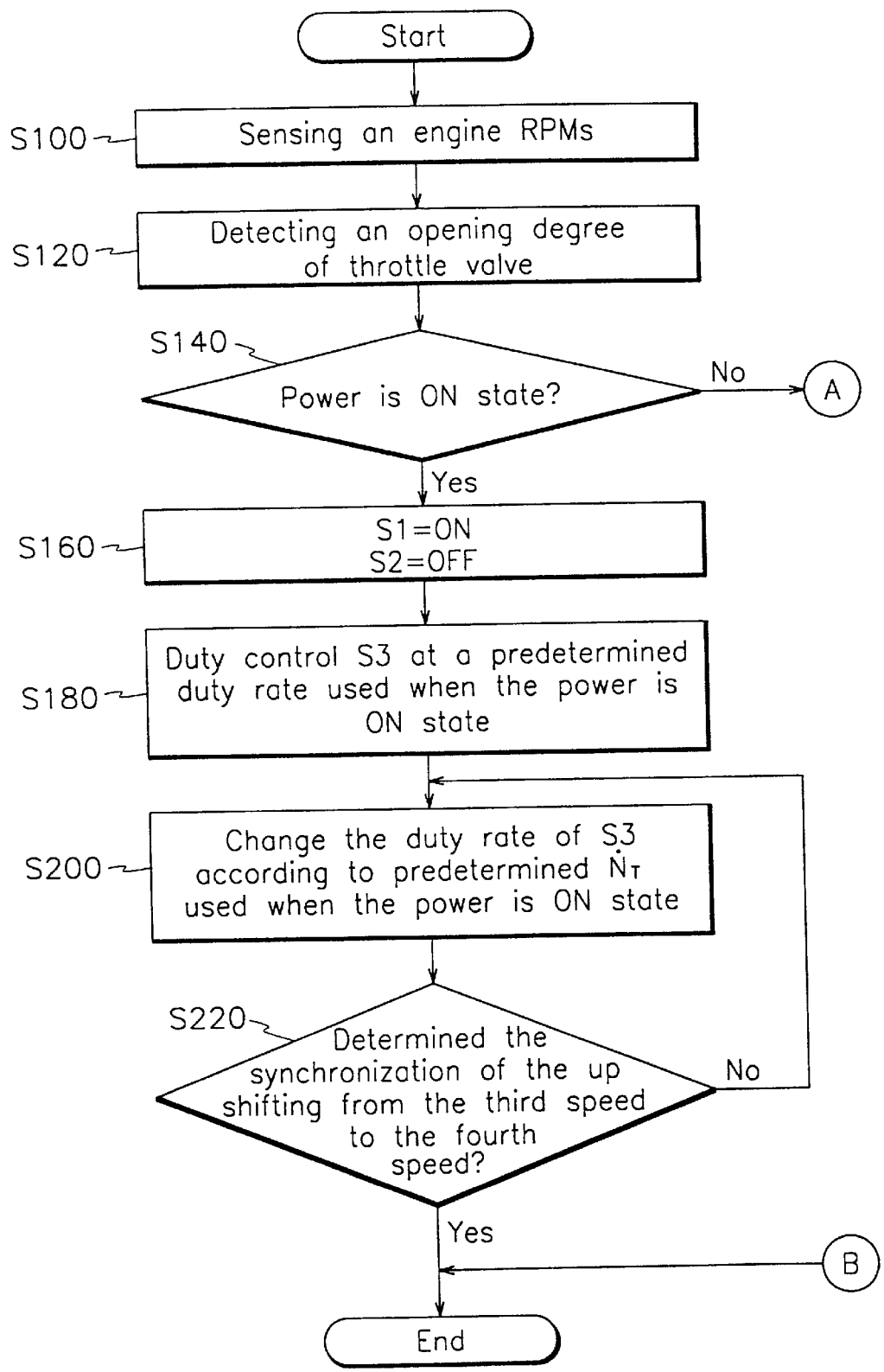
FIGS. 3A and 3B are flow charts which explain up shifting from third speed to fourth speed according to a power ON and power OFF state.
Figure 3B:
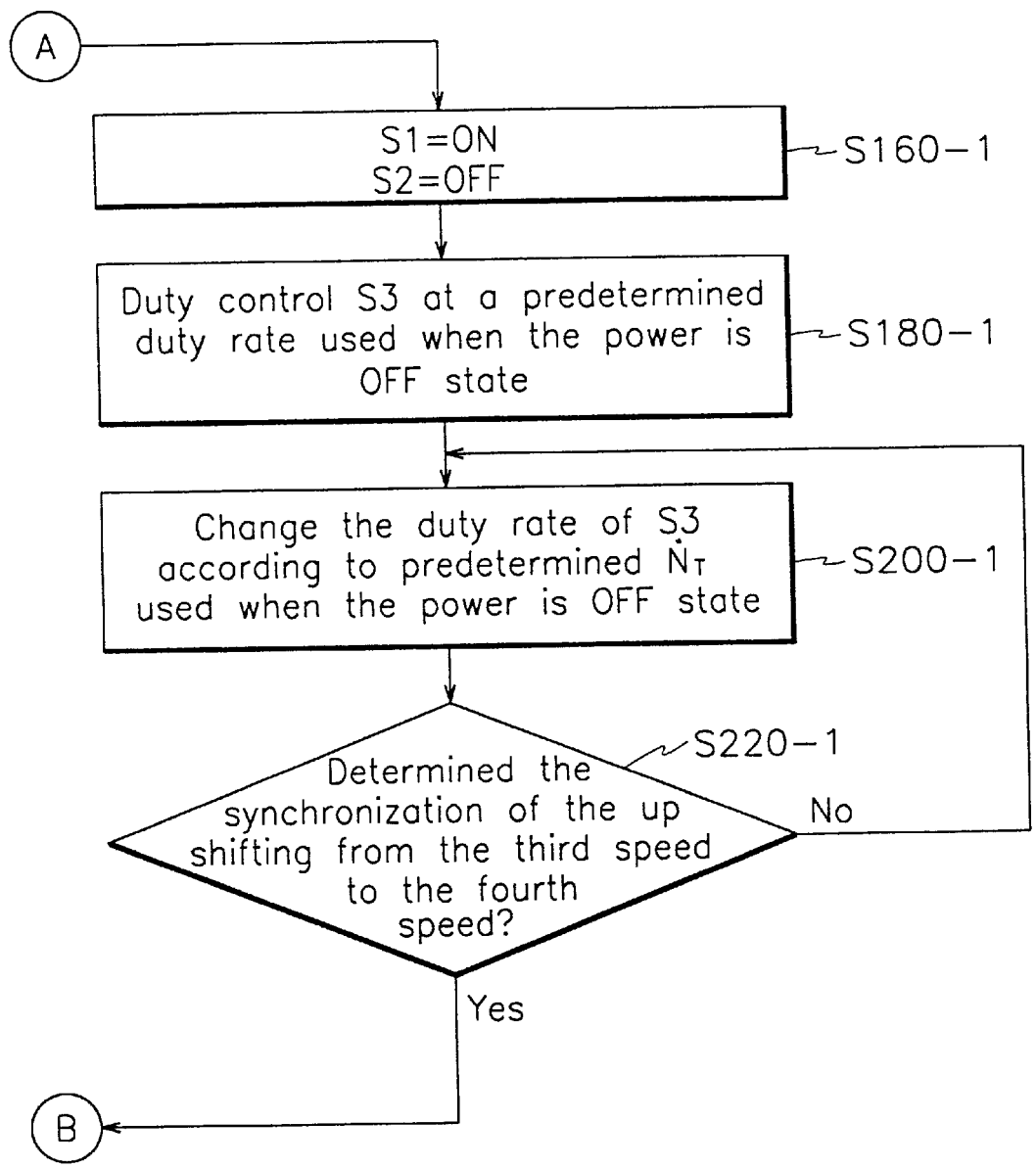
Figure 7:
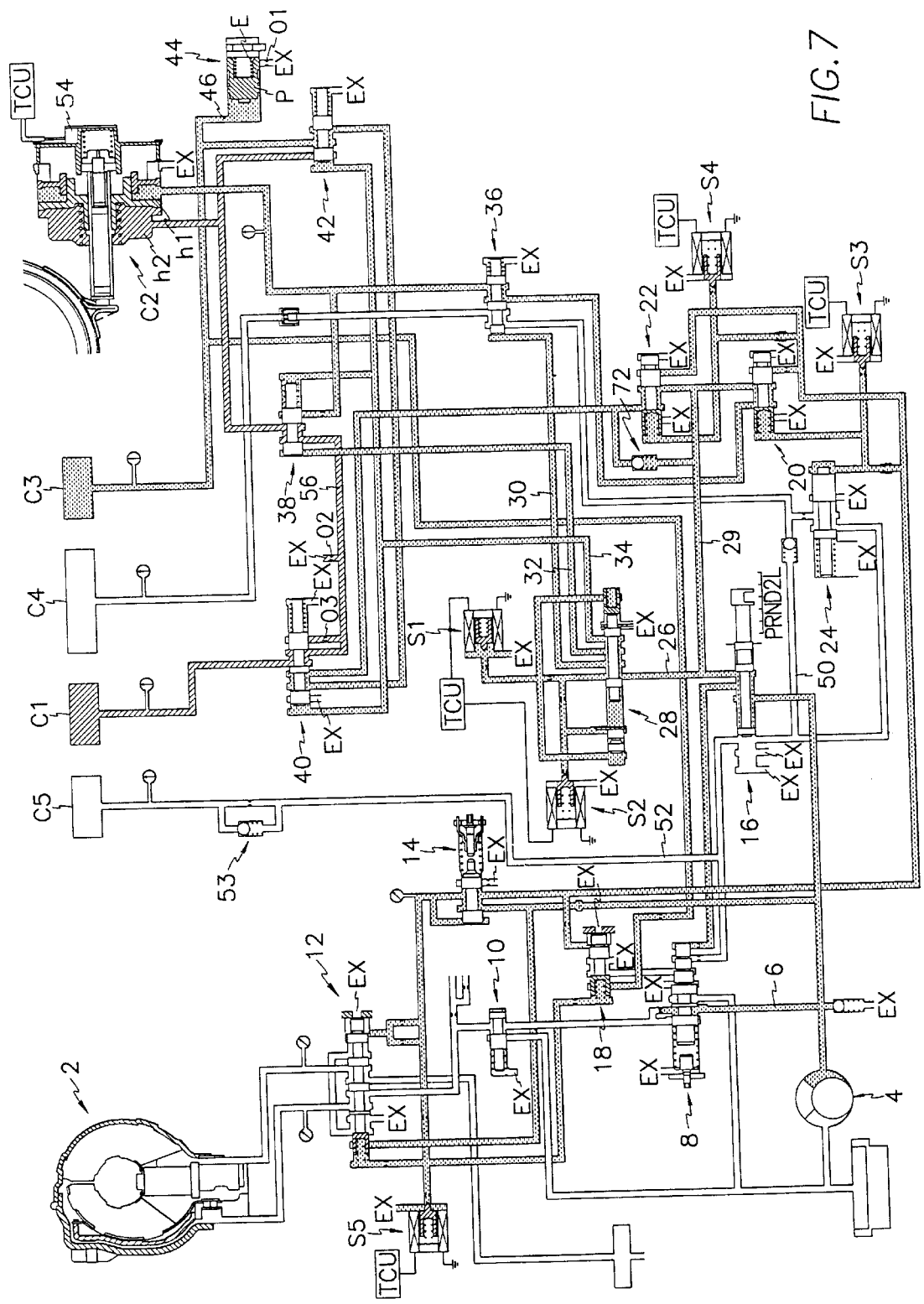
FIG. 7 is a hydraulic circuit diagram which shows a shifting procedure according to the shifting control of FIGS. 3A and 3B.

FIGS. 3A and 3B are flow charts, and FIG. 7 is a hydraulic pressure network used for explaining a process of up shifting from third speed to fourth speed. In the third speed, hydraulic pressure is supplied to the first and third friction elements C1 and C3. Like down shifting from fourth speed to third speed, the TCU senses engine RPM from the signal from the ignition coil Ic (S100), as well as an opening degree of the throttle valve from the signal transferred from the TPS (S120). On the basis of this data, the TCU determines whether the power is ON or OFF S140.

If the TCU determines that the power is ON, then the first solenoid valve S1 is switched ON, and the second solenoid valve S2 is switched OFF (S160). As a result, hydraulic pressure is supplied to the first, second, third, and fourth speed lines 29, 30, 32, and 34, as shown in FIG. 7. In this state, the TCU switches the third solenoid valve S3 to a predetermined duty rate used when the power is in an ON state (S180), and changes the duty rate of the third solenoid valve S3 according to a predetermined time rate of turbine revolutions (S200). Through this control, ports of the 2-4/3-4 shift valve 40, 2-3/4-3 shift valve 38, and end-clutch valve 42 are converted as follows.

A pressure line 56 is formed to release the hydraulic pressure supplied to the first friction element C1 and to the release chamber h2 of the second friction element C2 through an exhaust port EX. An orifice O2, formed in the exhaust port EX, produces a damping force while the hydraulic pressure is exhausted. Therefore, the first friction element C1 is disengaged, the second friction element C2 is engaged, and the third friction element C3 continues to be engaged through the conversion of the pressure line in the end-clutch valve 42, thereby completing shifting from third speed to fourth speed (S220). At this stage, if it is determined that synchronization is not completed, feedback is performed to step S200.

Further, if the TCU determines that the power is OFF in step S140, the first solenoid valve S1 is switched to an ON state and the second solenoid valve S2 is switched to an OFF state (S160-1) (see FIG. 3B), identical to the power ON state. Here, hydraulic pressure is still supplied as in the power ON state as shown in FIG. 7, and the TCU switches the third solenoid valve S3 to a predetermined duty rate used when the power is in an OFF state (S180-1). The TCU then changes the duty rate of the third solenoid valve S3 according to a predetermined time rate of turbine revolutions (S200-1). Using this control, the ports of the 2-4/3-4 shift valve 40, 2-3/4-3 shift valve 38, and end-clutch valve 42 are converted. Here also, the hydraulic pressure supplied to the first friction element C1 and the release chamber h2 of the second friction element C2 is released through the exhaust port EX arranged on the line 56 connecting the 2-4/3-4 shift valve 40 and 2-3/4-3 shift valve 38.

Because direct control of the operating pressure for the first friction element and the release pressure for the second friction element is possible, shift response is improved and hydraulic pressure control is facilitated.

Figure 4A:
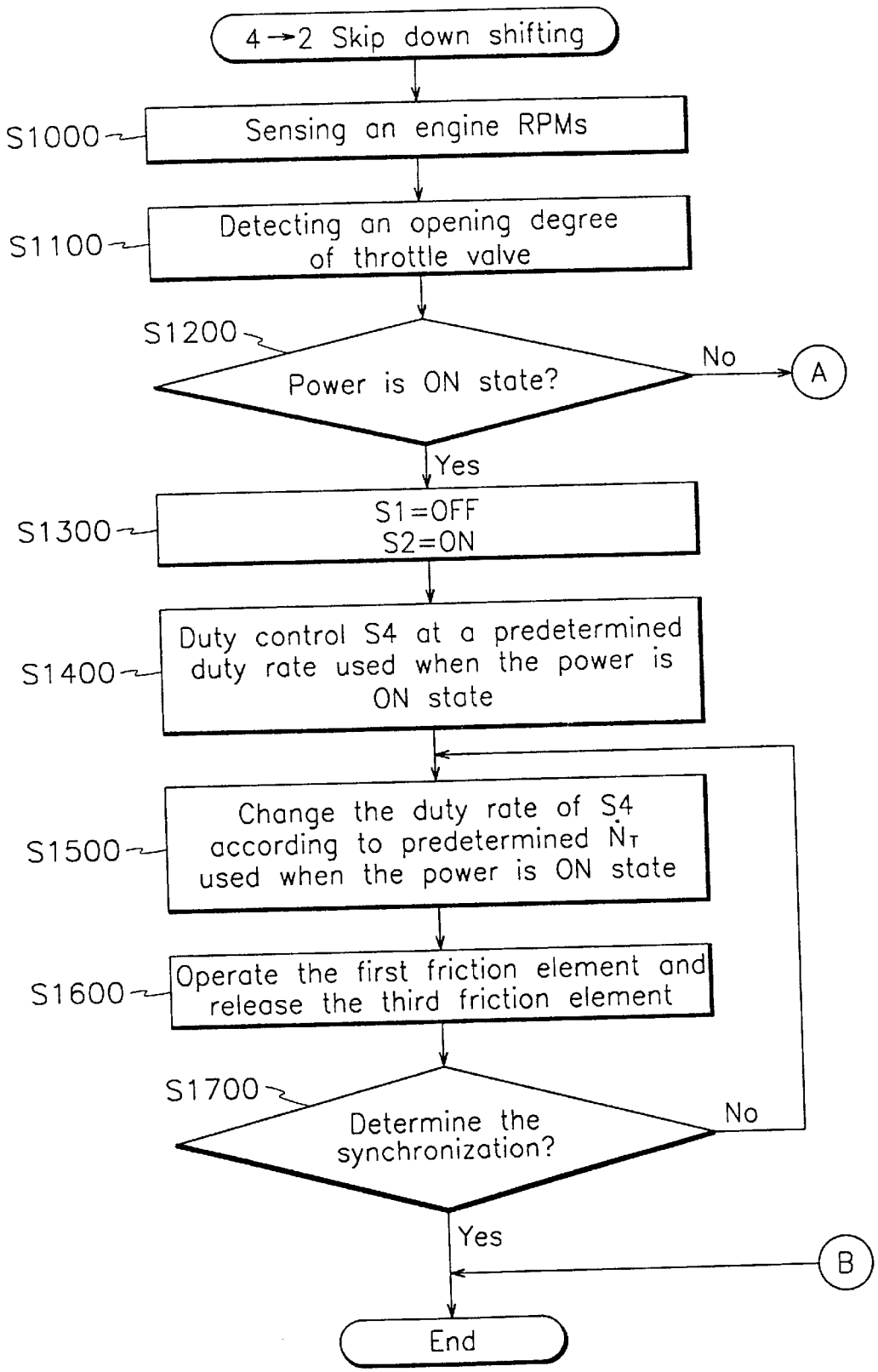
FIGS. 4A and 4B are flow charts which explain skip down shifting from fourth speed to second speed according to a power ON and power OFF state.
Figure 8A:
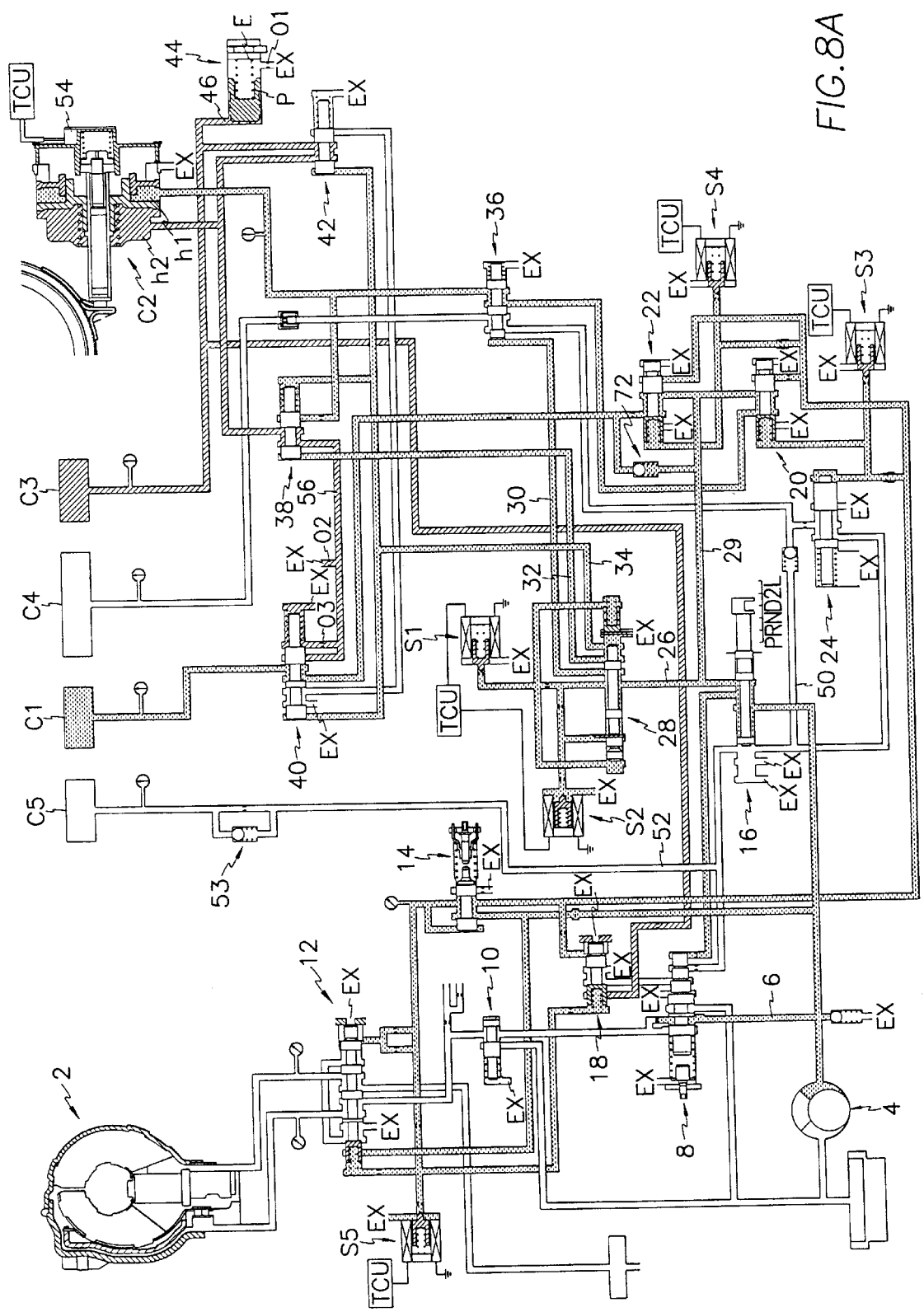
Figure 8B:
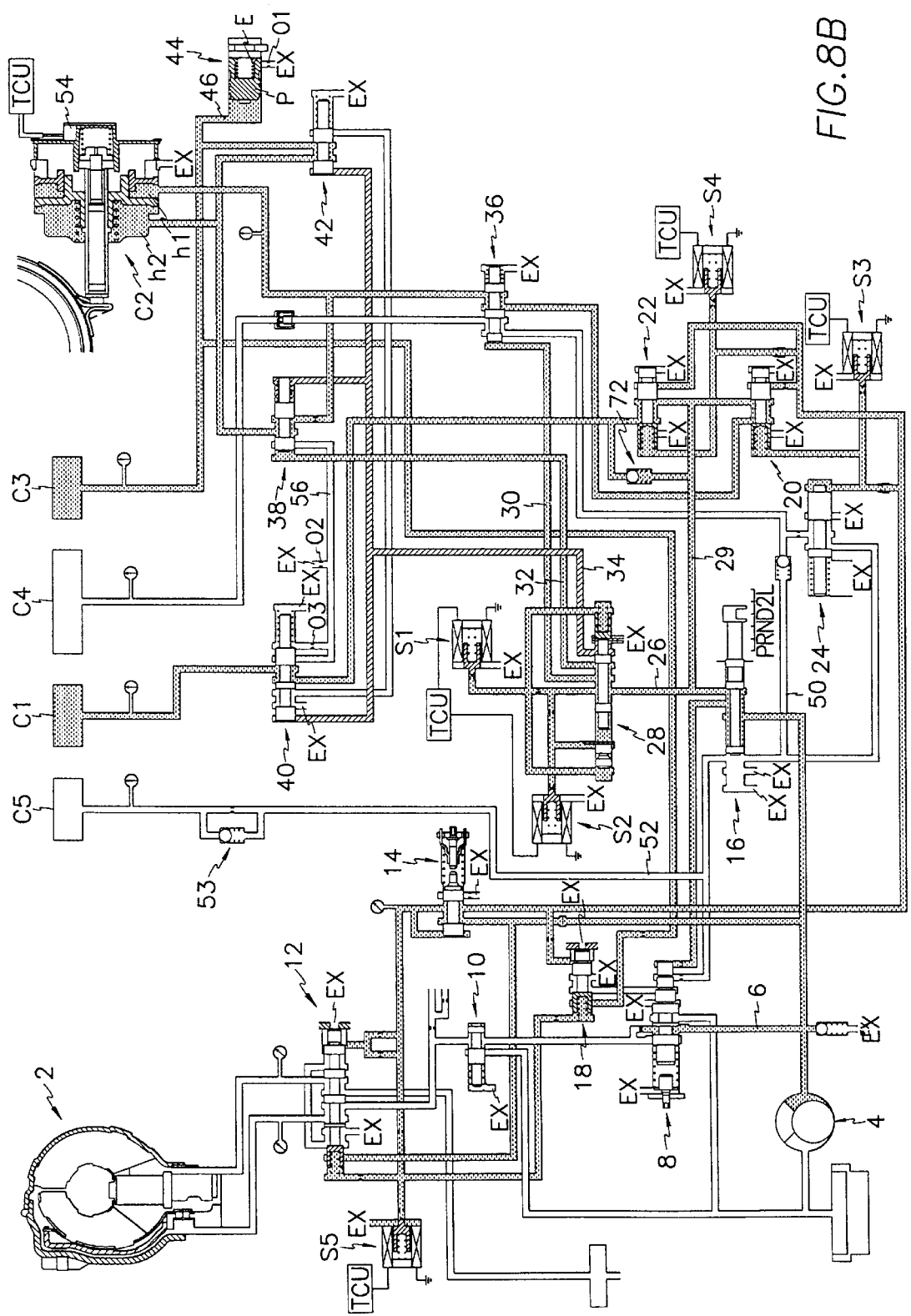

FIG. 4A is a flow chart and FIGS. 8A, 8B, and 8C are hydraulic pressure networks for describing skip down shifting from fourth speed to second speed. In the same manner as the foregoing shift control procedures, the TCU senses engine RPM from the signal from the ignition coil Ic (S1000), as well as an opening degree of a throttle valve from the signal from the TPS (S1100). On the basis of this data, the TCU determines whether the power is ON or OFF (S1200).

If the power is ON in step S1200, the TCU switches the first solenoid valve S1 to an OFF state and the second solenoid valve S2 to an ON state (S1300). As a result, the TCU sets the fourth solenoid valve S4 to a predetermined duty rate that is used when the power is in an ON state (S1400), and changes the duty rate of the fourth solenoid valve S4 according to a predetermined time rate of turbine revolutions (S1500). This control prevents hydraulic pressure from being supplied to the third speed line 32 and the fourth speed line 34. Therefore, the ports of the 2-4/3-4 shift valve 40, the 2-3/4-3 shift valve 38, and the end-clutch valve 42 are positioned as shown in FIG. 8A.

The hydraulic pressure flowing through the first speed line 29 is supplied to the first friction element C1 via the second pressure control valve 22 and 2-4/3-4 shift valve 40, thereby engaging this element. Also, the hydraulic pressure in the first speed line 29 is delivered to the operation chamber h1 of the second friction element C2 through the first pressure control valve 20 and the 1-2 shift valve 36. As a result, the second friction element C2 is engaged.

Furthermore, the hydraulic pressure engaging the third friction element C3 is exhausted through the exhaust port EX of the line 56 through the end-clutch valve 42 and the 2-3/4-3 shift valve 38, thereby disengaging the third friction element C3 (S1600). At this time, the hydraulic pressure, applied to the release chamber h2 of the second friction element C2, is exhausted simultaneously through the same port EX, and an impact load produced thereby is absorbed by the accumulator 44. It is then determined whether synchronization is complete. If not, feedback is performed to step S1500. This completes skip down shifting from fourth speed to second speed by down shifting without passing through third speed.

Figure 4B:
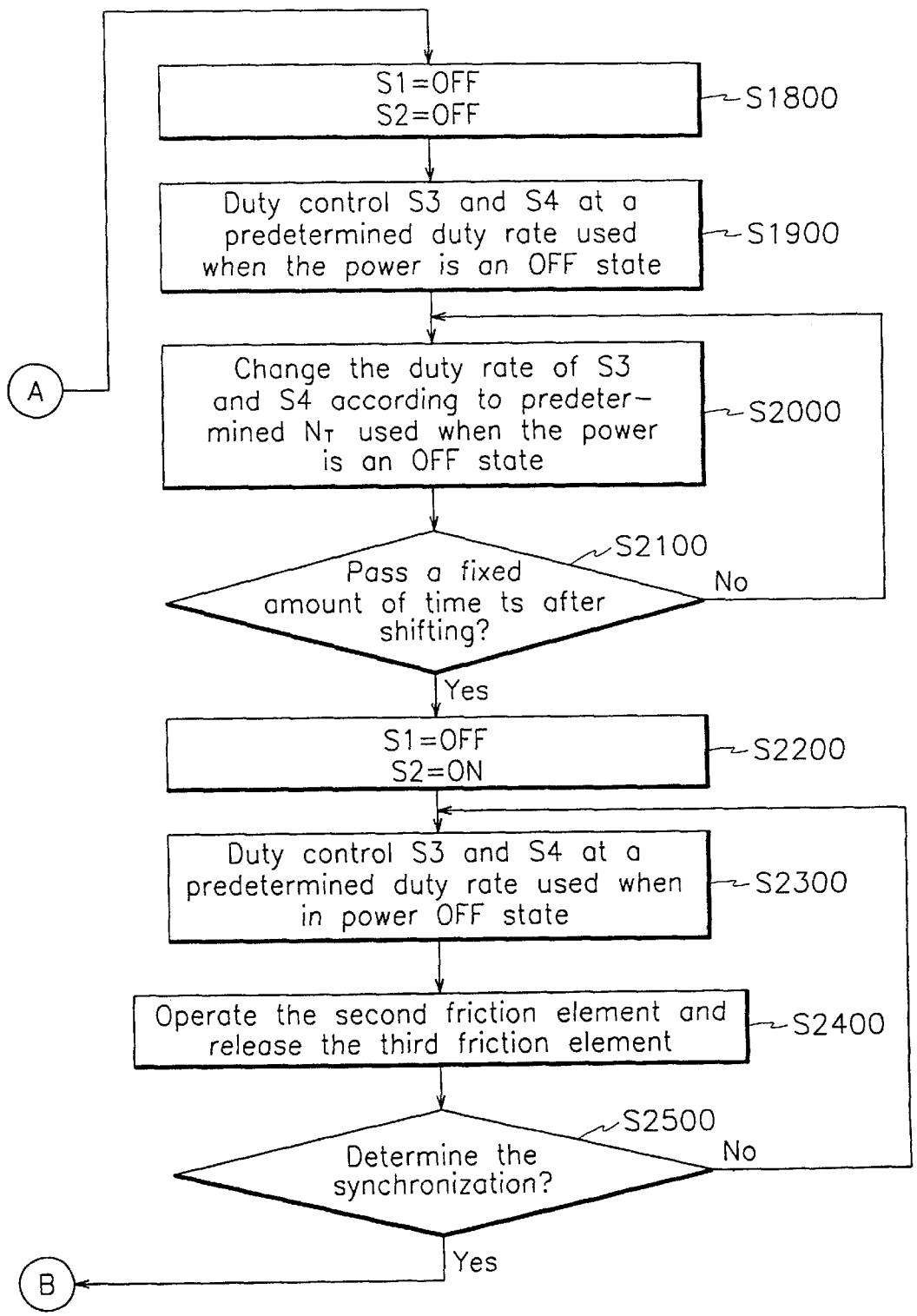

If the TCU determines that the power is in an OFF state at step S1200, both the first and second solenoid valves S1 and S2 are switched to OFF states (S1800) (see FIG. 4B). The TCU then sets controls the third and fourth solenoid valves S3 and S4 at a predetermined duty rate used in a power OFF state (S1900), and changes the duty rate of the third and fourth solenoid valves S3 and S4 according to a predetermined time rate of turbine revolutions (S2000). This positions the ports of the 2-4/3-4 shift valve 40, the 2-3/4-3 shift valve 38, and the end-clutch valve 42 as shown in FIG. 8B. The hydraulic pressure flowing through first speed line 29 engages the first friction element C1 through the second pressure control valve 22 and 2-4/3-4 shift valve 40. Also, the hydraulic pressure in the first speed line 29 is supplied to the second and third friction elements C2 and C3 through the first pressure control valve 20 and the 1-2 shift valve 36. The hydraulic pressure passing the 1-2 shift valve 36 is supplied to the operation chamber h1 of the second friction element C2, to the release chamber h2 of the second friction element C2 through the 2-3/4-3 shift valve 38, and to the third friction element C3 through the end-clutch valve 42 connected to the accumulator 44.

As a result, the third friction element C3 is engaged. Also, because an operating surface of the release chamber h2 is larger than that of the operation chamber h1, the second friction element C2 is released, thereby switching ON kick-down switch 54. This is an initial state of the skip down shifting control from fourth speed to second speed in a power OFF state, shown in FIG. 8B.

Next, the TCU determines whether a fixed amount of time $T_s$ has elapsed after shifting S2100. If the TCU determines it has, the TCU switches the first solenoid valve S1 to an OFF state and the second solenoid valve S2 to an ON state. Also, the TCU switches the third and fourth solenoid valves S3 and S4 to a predetermined duty rate used when in a power OFF state (S2300). This changes the ports of the 2-3/4-3 shift valve 38 by releasing the hydraulic pressure in the third speed line 32 as shown in FIG. 8C. The hydraulic pressure supplied to the third friction element C3 and the release chamber h2 of the second friction element C2 is exhausted through the exhaust port EX. Therefore, the third friction element C3 is released, the second friction element C2 is engaged and the first friction element is in engaged state (S2400). At this stage, it is determined whether synchronization is complete. If not, feedback is performed to step S2300. This control process improves shift response by down shifting from fourth speed to second speed without passing through third speed.

Figure 5A:
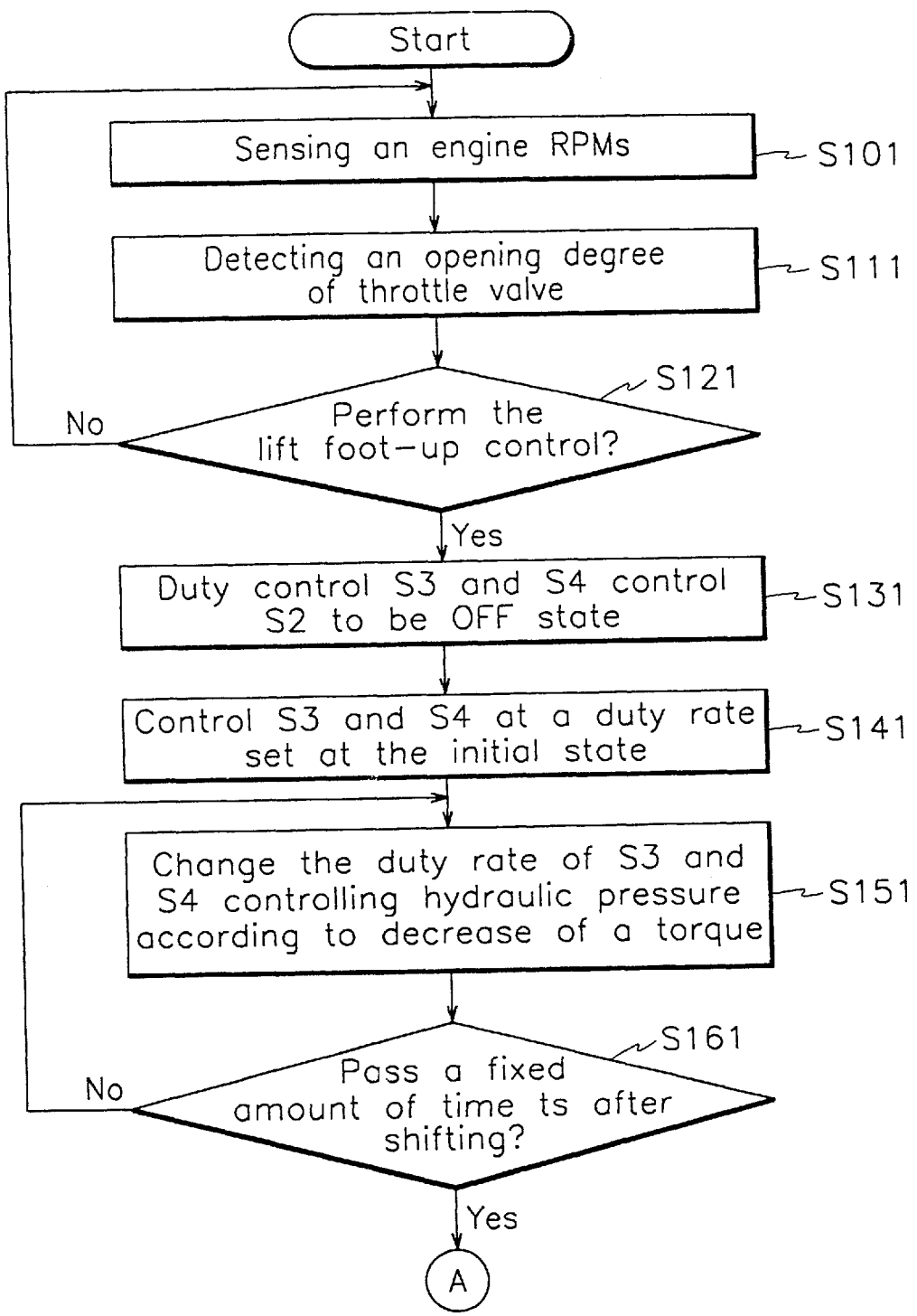
FIGS. 5A and 5B are flow charts which explain driver-induced skip shifting from the second speed to the fourth speed.
Figure 5B:
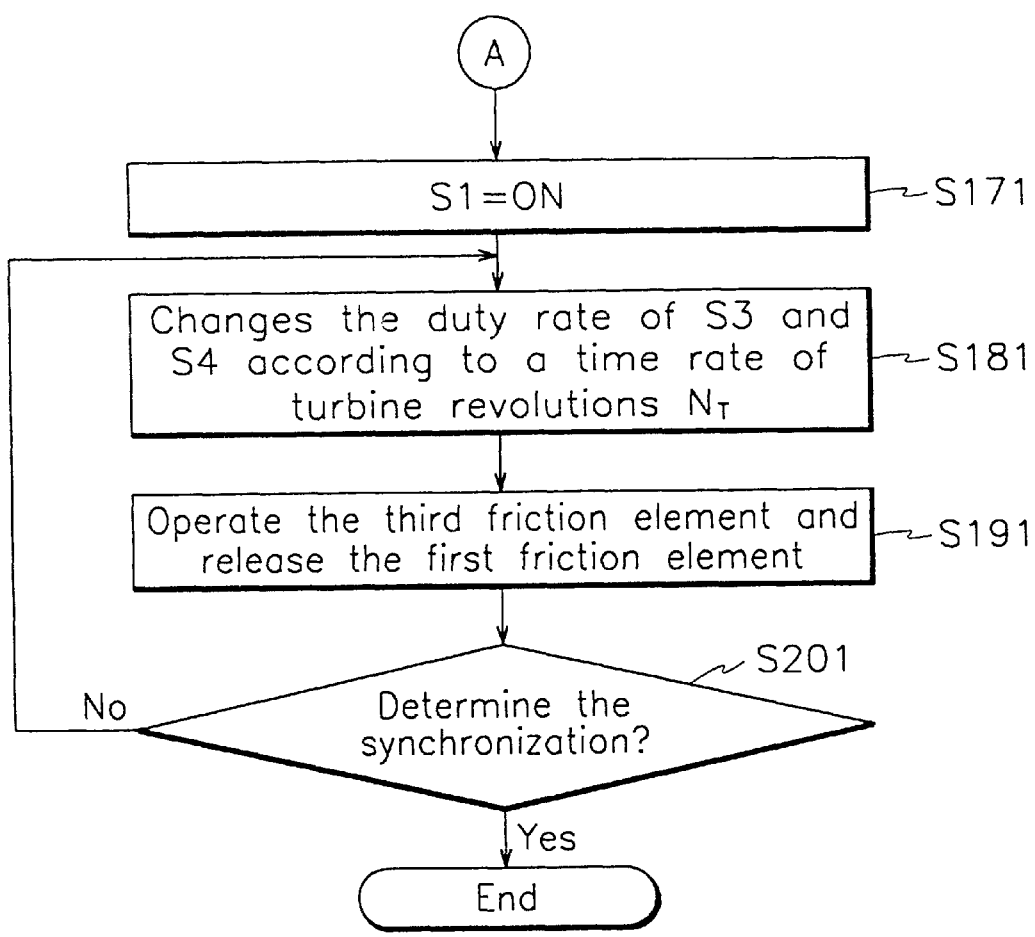
Figure 9A:
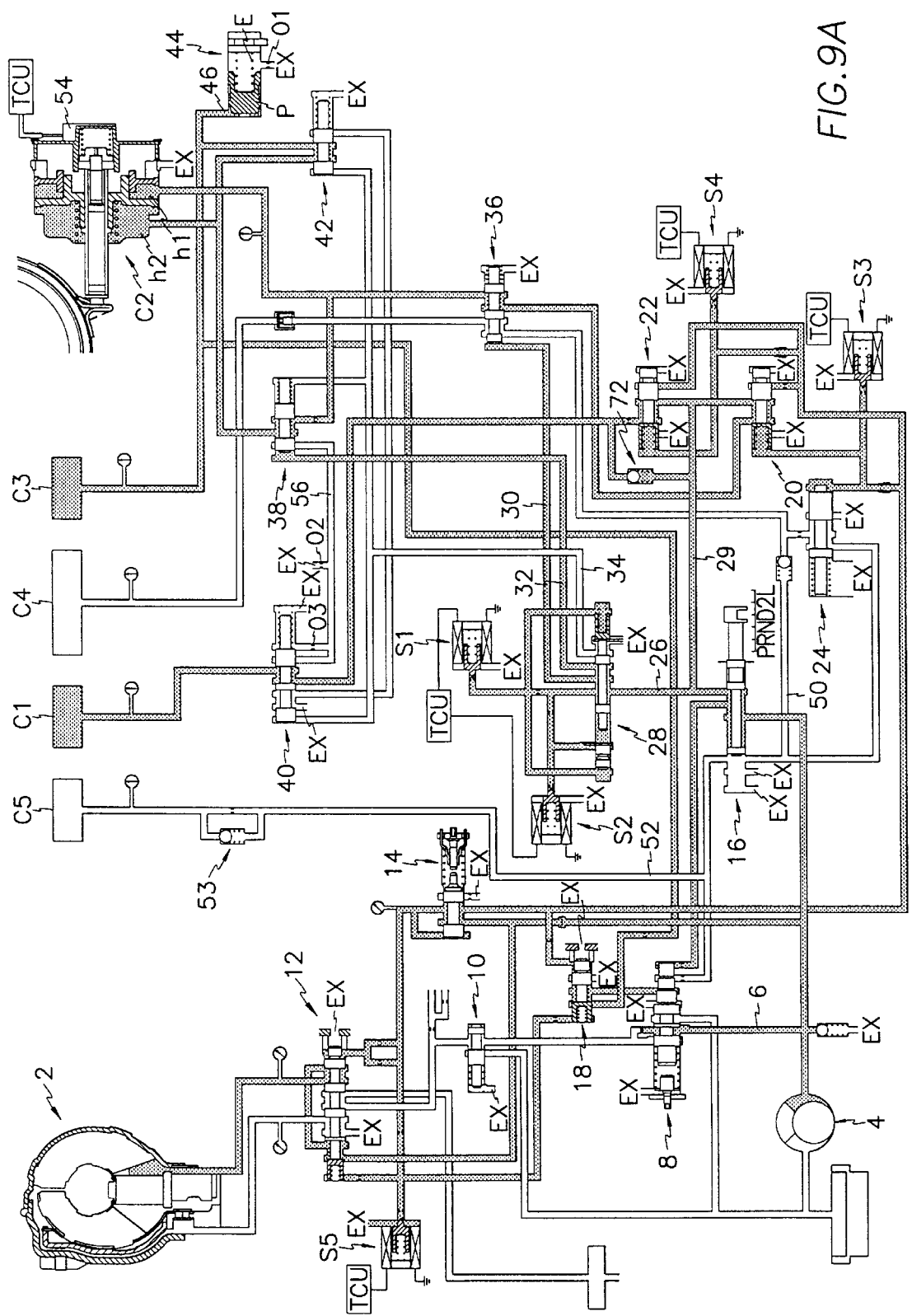
Figure 9B:
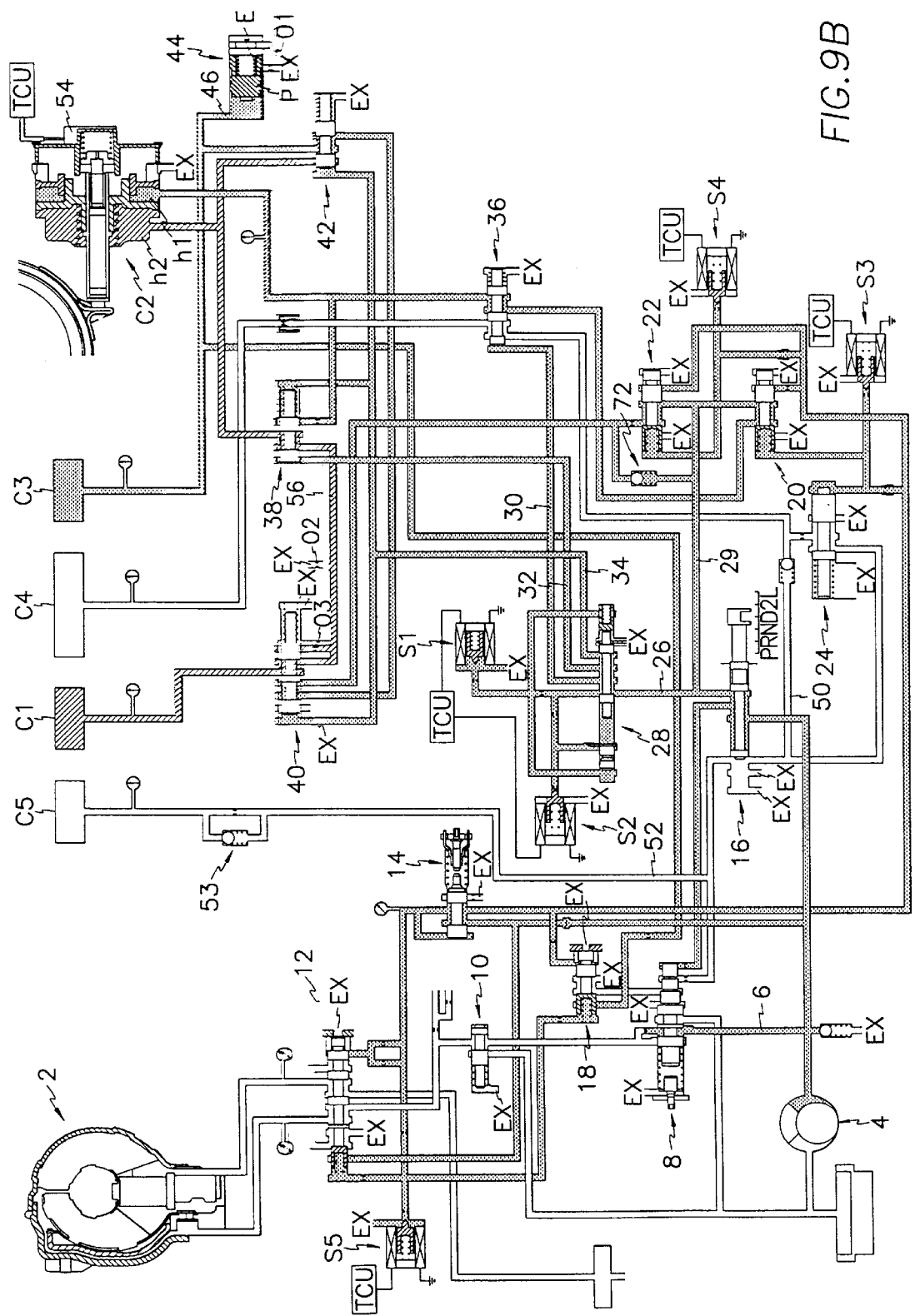

FIGS. 5A and 5B are is a flow charts, and FIGS. 9A and 9B illustrate hydraulic pressure networks for describing a 2-4 driver-induced, or "pedal release," skip shifting procedure in a power ON or OFF state. This is a skip shifting procedure from second speed to fourth speed performed when the driver quickly, but briefly, releases the accelerator pedal while driving in second speed. Pedal release skip shifting control is added to the present invention with the above shifting control methods. The operations involved when pedal release skip shifting are as follows.

If the accelerator pedal is quickly released while driving in second speed, the TCU senses engine RPM from the signal transferred from the ignition coil Ic (S101), and senses an opening degree of a throttle valve from the signal transferred from the TPS (S111). On the basis of this data, the TCU determines whether to perform pedal release skip shifting control (S121). If the TCU decides to perform the pedal release skip shifting control, it switches the second solenoid valve S2 to an OFF state and duty controls the third and fourth solenoid valves S3 and S4 (S131). This is the initial state of the second speed to fourth speed pedal release skip shifting control as shown in FIG. 9A. The hydraulic pressure, supplied to the first friction element C1, is incrementally lowered as it passes the second pressure control valve 22 by the fourth solenoid valve S4. The hydraulic pressure, supplied to the release chamber h2 of the second friction element C2 is incrementally lowered as it passes the first pressure control valve 20 by the third solenoid valve S3.

In the above initial state, the hydraulic pressure, supplied to the release chamber h2 of the second friction element C2 is immediately exhausted through the exhaust port EX provided on the line 56 when the 2-3/4-3 shift valve 38 performs port conversion. The hydraulic pressure supplied to the first friction element C1 is also immediately exhausted through the exhaust port EX on the line 56 when the 2-4/3-4 shift valve 40 performs port conversion. As this initial step is completed, the middle and end part of shifting is performed. As shown in FIG. 9B, the hydraulic pressure is supplied to the fourth speed line 34 from the shift control valve 28. As a result, hydraulic pressure is supplied simultaneously to the left port of the 2-4/3-4 shift valve 40, the right port of the 2-3/4-3 shift valve 38, and the left port of the end-clutch valve 42, thereby changing the flow of the hydraulic pressure. Here, the third solenoid valve S3 and the fourth solenoid valve S4 are set to a duty rate set at the initial state (S141). In accordance with a reduction in torque, the duty rates are then changed to control hydraulic pressure (S151).

Next, the TCU determines whether a fixed amount of time $T_s$ has passed after shifting (S161). If the TCU determines that it has, the TCU switches the first solenoid valve S1 to an ON state (S171). If not, feedback is performed to step S151. Also, the TCU changes the duty rate of the third and fourth solenoid valves S3 and S4 according to a predetermined time rate of turbine revolutions (S181). Accordingly, the hydraulic pressure supplied to the release chamber h2 of the second friction element C2 and to the first friction element C1 is exhausted through the exhaust port EX provided on the line 56. This results in the first friction element C1 being disengaged and the second friction element C2 being operated. At this time, the exhausted pressure is incrementally lowered through the orifice O2 of the exhaust port EX.

As a result, shift response is improved by allowing direct shifting from the second speed to fourth speed without passing through third speed. Furthermore, as release control of the first friction element is performed differently in the initial, middle, and end shift stages, shifting to other shift modes is performed smoothly when pedal release skip shifting is executed.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A method for controlling shifting of transmission speeds in an automatic power transmission connected to an engine having a throttle valve, comprising the steps of:

sensing an operating speed of the engine;

sensing a degree to which the throttle valve is open;

identifying whether the engine is in a power ON or a power OFF state based on information obtained by said steps of sensing a speed of the engine and sensing a degree to which the throttle is open;

providing a control hydraulic pressure to at least one shift valve controlling transmission speed shifting by controlling an ON/OFF state of first and second solenoid valves in accordance with the identified power ON or OFF state of the engine, the first and second solenoid valves controlling a setting of a shift control valve, which in turn controls a routing of the control hydraulic pressure from a hydraulic pressure source to the at least one shift valve;

setting a duty rate of at least one of third and fourth solenoid valves, connected to first and second hydraulic pressure control valves, respectively, in accordance with the identified power ON or power OFF state of the engine, whereby a position of the at least one shift valve is controlled to thereby control a shift in transmission speeds;

adjusting the duty rate of at least one of the third and fourth solenoid valves in accordance with a predetermined time rate of turbine revolutions and the identified power ON or power OFF state of the engine; and performing transmission synchronization.

2. The method according to claim 1, further comprising any one of the steps of:

completing down shifting between consecutive transmission speeds;

completing up shifting between consecutive transmission speeds; and completing skip down shifting between non-consecutive transmission speeds;

performed prior to said step of performing transmission synchronization.

3. The method according to claim 2, wherein, when said identifying step identifies a power ON state, said step of providing a control hydraulic pressure comprises setting the first solenoid valve to ON and the second solenoid valve to OFF.

4. The method according to claim 3, wherein said step of setting a duty rate of at least one of the third and the fourth solenoid valves comprises setting the duty rate of the third solenoid valve to a predetermined duty rate corresponding to the identified power ON state of the engine.

5. The method according to claim 4, wherein said step of adjusting the duty rate of at least one of the third and fourth solenoid valves comprises adjusting the duty rate of the third solenoid valve in accordance with a predetermined time rate of turbine revolutions, corresponding to the identified power ON state of the engine.

6. The method according to claim 5, wherein said step of performing transmission synchronization comprises a step of determining whether the transmission is synchronized after said step of up shifting between consecutive transmission speeds.

7. The method according to claim 6, wherein if the transmission is not synchronized, feedback is performed back to a point between said steps of setting the duty rate of the third solenoid and adjusting the duty rate of the third solenoid.

8. The method according to claim 7, wherein, when said identifying step identifies a power OFF state, said step of providing a control hydraulic pressure comprises setting the first solenoid valve to ON and the second solenoid valve to OFF.

9. The method according to claim 8, wherein said step of setting a duty rate of at least one of the third and the fourth solenoid valves comprises setting the duty rate of the third solenoid valve to a predetermined duty rate corresponding to the identified power OFF state of the engine.

10. The method according to claim 9, wherein said step of adjusting the duty rate of at least one of the third and fourth solenoid valves comprises adjusting the duty rate of the third solenoid valve in accordance with a predetermined time rate of turbine revolutions, corresponding to the identified power OFF state of the engine.

11. The method according to claim 10, wherein said step of performing transmission synchronization comprises a step of determining whether the transmission is synchronized after said step of upshifting between consecutive transmission speeds.

12. The method according to claim 11, wherein if the transmission is not synchronized, feedback is performed back to a point between said steps of setting the duty rate of the third solenoid valve and adjusting the duty rate of the third solenoid valve.

13. The method according to claim 2, wherein, when said identifying step identifies a power ON state, said step of providing a control hydraulic pressure comprises setting the first solenoid valve to OFF and the second solenoid valve to ON.

14. The method according to claim 13, wherein said step of setting a duty rate of at least one of the third and the fourth solenoid valves comprises setting the duty rate of the fourth solenoid valve to a predetermined duty rate corresponding to the identified power ON state of the engine.

15. The method according to claim 14, wherein said step of adjusting the duty rate of at least one of the third and fourth solenoid valves comprises adjusting the duty rate of the fourth solenoid valve in accordance with a predetermined time rate of turbine revolutions, corresponding to the identified power ON state of the engine.

16. The method according to claim 15, wherein said step of performing transmission synchronization comprises a step of determining whether the transmission is synchronized after skip down shifting between nonconsecutive transmission speeds.

17. The method according to claim 16, wherein if the transmission is not synchronized, feedback is performed back to a point between said steps of setting the duty rate of the fourth solenoid and adjusting the duty rate of the fourth solenoid.

18. The method according to claim 2, wherein, when said identifying step identifies a power OFF state, said step of providing a control hydraulic pressure comprises setting the first solenoid valve to OFF and the second solenoid valve to OFF.

19. The method according to claim 18, wherein said step of setting a duty rate of at least one of the third and the fourth solenoid valves comprises setting the duty rate of the third and fourth solenoid valves to a predetermined duty rate corresponding to the identified power OFF state of the engine.

20. The method according to claim 19, wherein said step of adjusting the duty rate of at least one of the third and fourth solenoid valves comprises adjusting the duty rate of the third and fourth solenoid valves in accordance with a predetermined time rate of turbine revolutions, corresponding to the identified power OFF state of the engine.

21. The method according to claim 20, further comprising a step of determining whether a predetermined time interval has elapsed since a particular transmission speed shift.

22. The method according to claim 21, further comprising a step of setting the first solenoid valve to an OFF state and the second solenoid valve to an ON state, if the predetermined time interval has elapsed.

23. The method according to claim 21, wherein, if said the predetermined time interval has not elapsed, feedback is performed to a point between said steps of setting the duty rate of the third and fourth solenoid valves to a predetermined duty rate corresponding to the identified power OFF state of the engine and adjusting the duty rate of the third and fourth solenoid valve in accordance with a predetermined time rate of turbine revolutions.

24. The method according to claim 22, further comprising a step of setting the third and fourth solenoid valves to a predetermined duty rate in accordance with the OFF state of the engine a second time.

25. The method according to claim 24, wherein said step of performing transmission synchronization comprises a step of determining whether the transmission is synchronized after said step of skip down shifting between nonconsecutive transmission speeds.

26. The method according to claim 25, wherein, if transmission synchronization is not complete, feedback is performed back to a point between said step of setting the first solenoid valve to an OFF state and the second solenoid valve to an ON state and setting the third and fourth solenoid valves to a predetermined duty rate in accordance with the OFF state of the engine a second time.

27. The method according to claim 2, wherein, when said identifying step identifies a power ON state, said step of providing a control hydraulic pressure comprises setting the first solenoid valve to OFF and the second solenoid valve to OFF.

28. The method according to claim 27, wherein said step of setting a duty rate of at least one of the third and the fourth solenoid valves comprises setting the duty rate of the third and fourth solenoid valves at a predetermined duty rate corresponding to the identified power ON state of the engine.

29. The method according to claim 28, wherein said step of adjusting the duty rate of at least one of the third and fourth solenoid valves comprises adjusting the duty rate of the third and fourth solenoid valves in accordance with a predetermined time rate of turbine revolutions, corresponding to the identified power ON state of the engine.

30. The method according to claim 29, wherein said step of performing transmission synchronization comprises a step of determining whether the transmission is synchronized after said step of down shifting between consecutive transmission speeds.

31. The method according to claim 30, wherein if the transmission is not synchronized, feedback is performed back to a point between said steps of setting the duty rate of the third and fourth solenoid valves and said step of adjusting the duty rate of the third and fourth solenoid valves.

32. The method according to claim 2, wherein, when said identifying step identifies a power OFF state, said step of providing a control hydraulic pressure comprises setting the first solenoid valve to OFF and the second solenoid valve to OFF.

33. The method according to claim 32, wherein said step of setting a duty rate of at least one of the third and the fourth solenoid valves comprises setting the duty rate of the third and fourth solenoid valves at a predetermined duty rate corresponding to the identified power OFF state of the engine.

34. The method according to claim 33, wherein said step of adjusting the duty rate of at least one of the third and fourth solenoid valves comprises adjusting the duty rate of the third and fourth solenoid valves in accordance with a predetermined time rate of turbine revolutions, corresponding to the identified power OFF state of the engine.

35. The method according to claim 34, wherein said step of performing transmission synchronization comprises a step of determining whether the transmission is synchronized after down shifting between consecutive transmission speeds.

36. The method according to claim 35, wherein if the transmission is not synchronized, feedback is performed back to a point between said steps of setting the duty rate of the third and fourth solenoid valves and adjusting the duty rate of the third and fourth solenoid valves.

37. A shifting control method for an automatic power transmission connected to an engine having a throttle valve and being controlled by an accelerator pedal, comprising the steps of:

sensing a speed of the engine;

sensing a degree to which the throttle valve is open;

determining whether the accelerator has been suddenly released based on information obtained by said steps of sensing a speed of the engine and sensing a degree to which the throttle valve is open;

regulating hydraulic pressure according to a decrease in engine torque, corresponding to the sudden release of the accelerator, by switching first and second solenoid valves connected to a shift control valve to OFF states and duty controlling third and fourth solenoid valves connected to first and second hydraulic control valves, respectively, whereby transmission skip up shifting is performed;

switching the first solenoid valve to an ON state after skip up shifting;

changing duty rates of the third and fourth solenoid valves, respectively, according to a predetermined time rate of turbine revolutions; and performing transmission synchronization after skip up shifting, caused by suddenly releasing the accelerator pedal, is completed.

* * * * *